J. A. & E. ADELL.
CUTTING TOOL.
APPLICATION FILED JUNE 2, 1910.
987,786.
Patented Mar. 28, 1911.
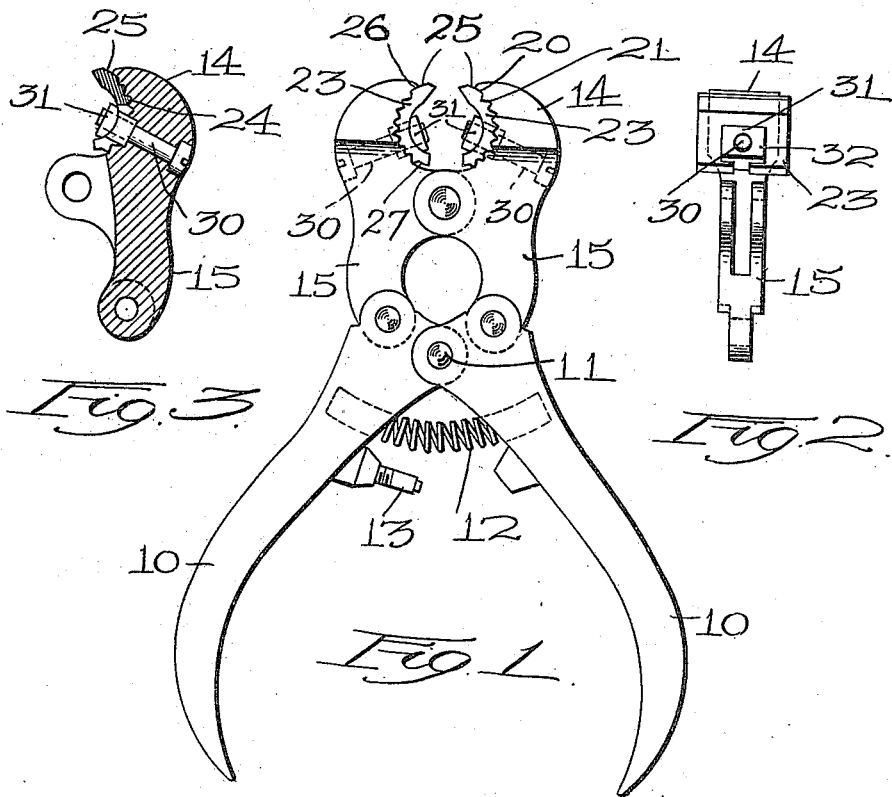
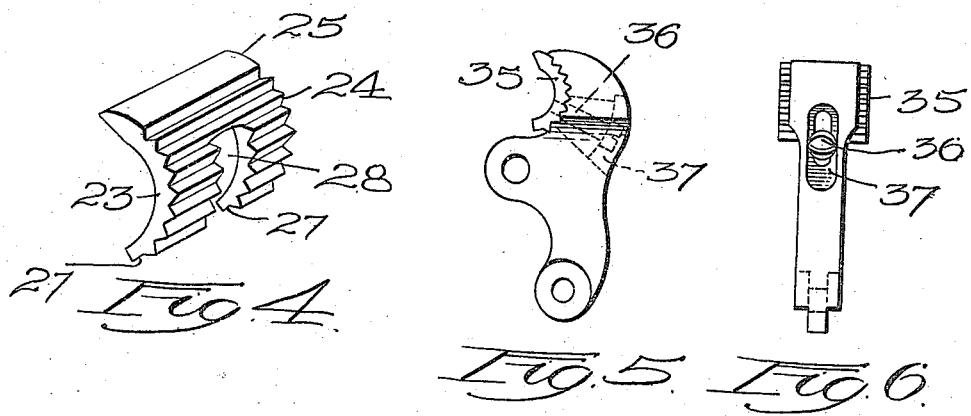
Witnesses:
C. F. Mesm
E. M. Allen
Inventors
John A. Adell
Edward Adell
By Attorneys
Southgate & Southgate

UNITED STATES PATENT OFFICE.

JOHN A. ADELL AND EDWARD ADELL, OF ORANGE, MASSACHUSETTS.

CUTTING-TOOL.

987,786.  Specification of Letters Patent.  Patented Mar. 28, 1911.

Application filed June 2, 1910. Serial No. 564,558.

*To all whom it may concern:*

Be it known that we, JOHN A. ADELL and EDWARD ADELL, citizens of the United States, both residing at Orange, in the county of Franklin and State of Massachusetts, have invented a new and useful Cutting-Tool, of which the following is a specification.

This invention relates to an implement for cutting and similar purposes, designed particularly for hand use, although the invention is capable of general application.

The principal objects of this invention are to provide a construction of this character particularly adapted for cut-nippers, pliers, and the like with simple practicable and efficient removable jaws so made and arranged that the presence of these replaceable jaws not only will not reduce the strength of the implement, but will actually add to it; also to provide efficient means whereby these jaws can be loosened and adjusted forward without removing them from the implement; and to provide improved means for holding the jaws in position, without forming any large recess in the main or removable jaw.

Further objects and advantages of the invention will appear hereinafter.

Reference is to be had to the accompanying drawings, in which—

Figure 1 is a side view of a pair of hand cut-nippers constructed in accordance with this invention; Fig. 2 is an inside elevation of one jaw of the cut-nippers showing how the same is fastened in position; Fig. 3 is a central longitudinal sectional view on the line 3—3 of Fig. 2 showing the fastening means; Fig. 4 is a perspective view of one of the removable jaws on enlarged scale; Fig. 5 is a side view of one of the jaws of the cut-nippers showing a modified way of attaching the removable jaw; and Fig. 6 is an elevation thereof.

Although capable of general use, the invention is shown as applied to a well-known type of cut-nippers having a pair of handles 10 pivoted together at 11 provided with a spring 12 and stop 13, and a pair of main jaws 14 connected by toggle joints 15. These jaws are shown as provided with concave inner faces 20, drawn on the arcs of circles. In the form shown in the drawings these faces are curved on the arc of the same circle when the jaws are closed together, but this exact curve is not absolutely essential. The inner surfaces of these faces are provided with a plurality of teeth 21. In the present instance these teeth are shown as having their two surfaces making an angle of 90 degrees with each other. The teeth extend from a point well at the rear almost to the point of the jaws. Mounted in these jaws in contact with these teeth are two removable arcuate hardened steel jaws 23. Each one is curved on the outside on the same curvature as the inner faces of the main jaws of the implement, and they are provided with external teeth 24 of the same size and shape as the teeth 21. Each of these jaws is provided with a sharp edge on the outer side and the surface 25 adjacent to this edge is of the full size of the outside circle of the teeth, but is free from teeth for a short distance from the point. This surface 25 is curved concentrically with the circle of teeth and its inner portion is in contact with a similar surface 26 on the main jaw which also is free from teeth. As these two surfaces come into contact with each other, the latter forms a firm support for the cutting edge of the jaw. At the rear of the removable jaw there is a space 27 also which is free from teeth.

The removable jaws are held in position in such a way as to secure a firm support and avoid weakening the main jaws. For this purpose in the form shown in the first four figures, each jaw 23 is provided at the rear with a central longitudinal slot 28. Passing through the main jaw 14 radially with respect to the circle of the teeth and on a line with a point slightly back of the front edge of the opposite main jaw is a holding screw 30. This screw has a head countersunk in the outer part of the main jaw and it is provided with a nut 31 having a portion extending into the slot 28, and also having flanges 32 on the sides which project over the edges of the slot. By screwing this screw in from the outside the nut can be firmly clamped in position so as to hold the removable jaw firmly in place. It has been found in practice that this is a very efficient way of holding the jaw and that the strength of the device is not in any way weakened by it. It will be seen that on account of the direction of the screw the strain exerted on cutting will be substantially parallel with the screw and the metal of the main jaw is enlarged at the proper point to sustain this strain. It is preferred to have the removable jaws somewhat wider than the main jaws as shown. In use it will be obvious that the fastening screw can be loosened and the jaw moved along with a circular movement to adjust the jaw to the proper cutting position. If necessary the stop 13 is also adjusted.

Another form of fastening device for the removable jaw is shown in Figs. 5 and 6. In this case the removable jaw 35 is provided with a tapped hole into which a screw 36 passes. The main jaw is provided with an elongated opening or slot 37 for this screw. In this case in adjusting the jaw 35 it is moved with a circular movement taking with it the fastening screw.

While we have illustrated and described two preferred embodiments of the invention we are aware that many other modifications can be made therein by any person skilled in the art, without departing from the scope of the invention as expressed in the claims. Therefore, we do not wish to be limited to all the details of construction herein shown and described, but What we do claim is:—

1. In an implement of the class described, the combination of a pair of pivotally connected main jaws, each having a concave inner face provided with transverse teeth, and a pair of removable cutting jaws fitting said concave surface, each consisting of an arcuate piece of metal having a cutting edge along one side, and provided with parallel teeth on its convex surface parallel with said cutting edge.

2. In an implement of the class described, the combination of a pair of pivotally connected main jaws, each having a concave inner face provided with transverse teeth, and a pair of removable cutting jaws fitting said concave surface, each consisting of an arcuate piece of metal having a cutting edge along one side, and provided with parallel teeth on its convex surface parallel with said cutting edge, said convex surface being free of teeth for a distance at its opposite sides, and the jaw having a perforation for the reception of a fastening device.

3. In an implement of the class described, the combination of a pair of pivoted main jaws having concave inner faces having substantially the same curvature and provided with transverse teeth, a pair of removable jaws therefor, each consisting of a piece of metal having a curved outer face provided with teeth fitting the teeth in the face of one of the main jaws and having a cutting edge on the outer side, and a removable fastening device extending through each main jaw for securing the removable jaw in position and permitting the adjustment of the removable jaw by a circular motion along the circle of the teeth.

4. In an implement of the class described, the combination of a pair of pivotally connected main jaws, each having a concave inner face provided with transverse teeth, a pair of removable cutting jaws fitting said concave surface and adapted to be adjusted therealong, and fastening means extending through the main jaws, each substantially in line with the outer edge of the opposite main jaw.

5. In an implement of the class described, the combination of a pair of pivotally connected main jaws, each having a concave inner face provided with transverse teeth, a pair of removable cutting jaws fitting said concave surface and adapted to be adjusted therealong, and fastening means extending through the main jaws, each substantially in line with the outer edge of the opposite main jaw, each consisting of a screw passing through the main jaw, said removable jaw having a slot for receiving the end of said screw, and a nut on the inside of the removable jaw for receiving the end of the screw and having a projection extending into said slot.

In testimony whereof we have hereunto set our hands, in the presence of two subscribing witnesses.

JOHN A. ADELL.
EDWARD ADELL.

Witnesses:
CARL C. HARRIS,
IRA G. FRENCH.

---

Copies of this patent may be obtained for five cents each, by addressing the "Commissioner of Patents, Washington, D. C."